US012764126B2

(12) United States Patent
Liu et al.

(10) Patent No.: US 12,764,126 B2
(45) Date of Patent: Oct. 13, 2026

(54) REAL-TIME DETECTION OF DNS TUNNELING TRAFFIC

(71) Applicant: Palo Alto Networks, Inc., Santa Clara, CA (US)

(72) Inventors: Daiping Liu, San Jose, CA (US); Jun Wang, Fremont, CA (US); Martin Walter, Livermore, CA (US); Fan Fei, San Jose, CA (US); Wei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 287 days.

(21) Appl. No.: 16/799,655

(22) Filed: Feb. 24, 2020

(65) Prior Publication Data

US 2021/0266293 A1 Aug. 26, 2021

(51) Int. Cl.

| | |
|---|---|
| ***H04L 29/06*** | (2006.01) |
| ***G06F 18/22*** | (2023.01) |
| ***G06F 18/243*** | (2023.01) |
| ***H04L 9/40*** | (2022.01) |
| ***H04L 12/46*** | (2006.01) |

(Continued)

(52) U.S. Cl.

CPC .......... *H04L 63/1416* (2013.01); *G06F 18/22* (2023.01); *G06F 18/24323* (2023.01); *H04L 12/4633* (2013.01); *H04L 61/4511* (2022.05); *H04L 61/4552* (2022.05);

(Continued)

(58) Field of Classification Search

CPC ............... H04L 61/1511; H04L 63/029; H04L 63/1416; H04L 63/1441; H04L 63/1466; H04L 61/4511; H04L 61/5007; H04L 63/1425; H04L 63/1483; H04L 63/12; H04L 63/0218; H04L 63/1408; H04L 63/0272; H04L 67/30; H04L 63/1433; H04L 43/091; H04L 61/3025; H04L 63/20; G06N 20/20; G06N 3/044; G06N 3/08; G06F 17/18; G06F 16/90344;

(Continued)

(56) References Cited

U.S. PATENT DOCUMENTS

| | | | |
|---|---|---|---|
| 7,467,410 | B2 | 12/2008 | Graham |
| 7,934,254 | B2 | 4/2011 | Graham |

(Continued)

FOREIGN PATENT DOCUMENTS

| | | |
|---|---|---|
| CN | 105577660 | 3/2019 |
| WO | 2007050244 | 5/2007 |

OTHER PUBLICATIONS

Liu et al., CCGA: Clustering and Capturing Group Activities for DGA-Based Botnets Detection, 2019 18th IEEE International Conference on Trust, Security and Privacy in Computing and Communications/ 13th IEEE International Conference on Big Data Science and Engineering, Aug. 5, 2019, pp. 136-143.

(Continued)

*Primary Examiner* — Dustin Nguyen

(74) *Attorney, Agent, or Firm* — Van Pelt, Yi & James LLP

(57) ABSTRACT

Detection of DNS tunneling traffic is disclosed. A DNS query comprising a subdomain portion and a root domain portion is received from a client device. A determination is made that the root domain portion received in the DNS query is associated with a malicious DNS tunneling root domain. A remedial action is taken in response to the determining.

31 Claims, 7 Drawing Sheets

(51) Int. Cl.
*H04L 61/4511* (2022.01)
*H04L 61/4552* (2022.01)
*H04L 61/5007* (2022.01)

(52) U.S. Cl.
CPC ...... *H04L 61/5007* (2022.05); *H04L 63/0236* (2013.01); *H04L 63/1433* (2013.01); *H04L 63/1466* (2013.01)

(58) Field of Classification Search
CPC ...... G06F 21/00; G06F 21/566; G06F 21/554; G06F 21/6245
See application file for complete search history.

(56) References Cited

U.S. PATENT DOCUMENTS 7,958,555 B1 6/2011 Chen
8,141,157 B2 3/2012 Farley
8,260,914 B1 9/2012 Ranjan
8,269,914 B2 9/2012 Huo
8,494,985 B1 * 7/2013 Keralapura ............. H04L 63/12 706/12
8,561,177 B1 10/2013 Aziz
8,566,928 B2 10/2013 Dagon
8,631,489 B2 1/2014 Antonakakis
8,826,444 B1 9/2014 Kalle
9,043,894 B1 * 5/2015 Dennison ............ H04L 63/1408 726/11
9,178,901 B2 * 11/2015 Xue .................... H04L 63/1483
9,330,258 B1 * 5/2016 Satish ................. H04L 63/1441
9,356,942 B1 5/2016 Joffe
9,363,282 B1 6/2016 Yu
9,497,213 B2 11/2016 Thompson
9,516,039 B1 * 12/2016 Yen ..................... H04L 63/1425
9,621,576 B1 * 4/2017 Oprea ..................... H04L 67/30
9,922,190 B2 3/2018 Antonakakis
10,089,411 B2 * 10/2018 Kassa ............... G06F 16/90344
10,097,568 B2 10/2018 Baughman
10,270,744 B2 * 4/2019 Yu ......................... H04L 63/029
10,362,057 B1 7/2019 Wu
10,673,880 B1 * 6/2020 Pratt ................... H04L 63/1425
10,679,088 B1 * 6/2020 Dalal .................. H04L 61/4511
10,848,509 B1 * 11/2020 McNab ............... H04L 61/4511
10,958,668 B1 * 3/2021 Wang .................... G06F 21/554
11,153,330 B1 10/2021 Antoniewicz
11,159,486 B2 * 10/2021 Pangeni .............. H04L 63/0218
2002/0111769 A1 * 8/2002 Takeuchi ................ G06F 17/18 702/181
2004/0073640 A1 4/2004 Martin
2006/0212925 A1 9/2006 Shull
2008/0028463 A1 1/2008 Dagon
2008/0155694 A1 6/2008 Kwon
2009/0089426 A1 4/2009 Yamasaki
2010/0192225 A1 7/2010 Ma
2011/0078794 A1 3/2011 Manni
2011/0191423 A1 8/2011 Krasser
2011/0231935 A1 * 9/2011 Gula ....................... G06F 21/00 709/224
2011/0283359 A1 11/2011 Prince
2011/0283361 A1 11/2011 Perdisci
2011/0302656 A1 * 12/2011 El-Moussa .......... H04L 63/1416 726/24
2012/0054860 A1 * 3/2012 Wyschogrod ....... H04L 61/4511 726/22
2012/0303808 A1 11/2012 Xie
2012/0304287 A1 * 11/2012 Yu ....................... H04L 63/1466 726/22
2013/0080574 A1 3/2013 Prince
2013/0174253 A1 * 7/2013 Thomas .............. H04L 63/1416 726/22
2013/0191915 A1 7/2013 Antonakakis
2013/0232574 A1 9/2013 Carothers
2014/0013434 A1 1/2014 Ranum
2014/0068763 A1 3/2014 Ward
2014/0068775 A1 3/2014 Ward
2014/0075558 A1 3/2014 Ward
2014/0090058 A1 3/2014 Ward
2014/0143825 A1 5/2014 Behrendt
2014/0230062 A1 * 8/2014 Kumaran ............ H04L 63/1408 726/24
2014/0245436 A1 8/2014 Dagon
2014/0283063 A1 9/2014 Thompson
2014/0298460 A1 * 10/2014 Xue .................... H04L 63/1483 726/23
2015/0007250 A1 1/2015 Dicato, Jr.
2015/0007312 A1 * 1/2015 Pidathala ............ H04L 63/1433 726/22
2015/0143504 A1 5/2015 Desai
2015/0188879 A1 * 7/2015 Cha ....................... H04L 43/091 709/223
2015/0264070 A1 9/2015 Harlacher
2015/0281257 A1 10/2015 Hart
2016/0036848 A1 2/2016 Reddy
2016/0065611 A1 * 3/2016 Fakeri-Tabrizi .... H04L 63/1441 726/23
2016/0294773 A1 * 10/2016 Yu ....................... H04L 63/1425
2016/0352679 A1 12/2016 Hagen
2016/0352772 A1 * 12/2016 O'Connor ........... H04L 63/1483
2016/0359887 A1 * 12/2016 Yadav ................. H04L 61/1511
2017/0126706 A1 5/2017 Minea
2017/0195285 A1 * 7/2017 Kakhki ............... H04L 61/3025
2017/0295187 A1 * 10/2017 Havelka .............. H04L 63/1441
2017/0331789 A1 * 11/2017 Kumar ................ H04L 63/0272
2018/0063162 A1 * 3/2018 Baughman .......... H04L 63/1416
2018/0081991 A1 * 3/2018 Barber ................ H04L 63/1441
2018/0115582 A1 * 4/2018 Thakar ................ H04L 63/1466
2018/0124020 A1 5/2018 Rodriguez
2018/0198821 A1 * 7/2018 Gopalakrishna ...... G06F 21/566
2018/0278633 A1 * 9/2018 Brutzkus ............. H04L 61/5007
2018/0309795 A1 * 10/2018 Ithal ........................ H04L 63/20
2018/0351972 A1 12/2018 Yu
2019/0268379 A1 * 8/2019 Narayanaswamy ......................... G06F 21/6245
2020/0059451 A1 * 2/2020 Huang ................... G06N 3/044
2020/0169570 A1 5/2020 Kleymenov
2020/0228500 A1 * 7/2020 Olumofin ................. G06N 3/08
2021/0097168 A1 * 4/2021 Patel ..................... G06F 21/554
2021/0126901 A1 * 4/2021 Rodriguez ............. G06N 20/20
2021/0203693 A1 * 7/2021 Clausen .............. H04L 63/1425
2021/0266293 A1 8/2021 Liu
2021/0400061 A1 * 12/2021 Antoniewicz ....... H04L 61/4511
2022/0070194 A1 * 3/2022 Pon ..................... H04L 61/4511

OTHER PUBLICATIONS

Qi et al., BotCensor: Detecting DGA-Based Botnet Using Two-Stage Anomaly Detection, 2018 17th IEEE International Conference on Trust, Security and Privacy in Computing and Communications/ 12th IEEE International Conference on Big Data Science and Engineering, Aug. 1, 2018, pp. 754-762.
Alan Shaikh, Botnet Analysis and Detection System, Nov. 2010.
Antonakakis et al., DGAs and Cyber-Criminals: A Case Study, 2012.
Antonakakis et al., From Throw-Away Traffic to Bots: Detecting the Rise of DGA-Based Malware, 21st {USENIX} Security Symposium ({USENIX} Security 12), 2012, pp. 491-506.
Christian Rossow, Thesis, Using Malware Analysis to Evaluate Botnet Resilience, Apr. 23, 2013.
Dietrich et al., On Botnets That Use DNS for Command and Control, 2011 Seventh European Conference on Computer Network Defense, 2011, pp. 9-16.
Gavin E. Crooks, Inequalities Between the Jenson-Shannon and Jeffreys Divergences, 2008.
Greg Farnham, Detecting DNS Tunneling, SANS Institute Information Security Reading Room, Jun. 2012.
Guy Bruneau, DNS Sinkhole, Aug. 7, 2010, Sans Institute InfoSec Reading Room, pp. 1-41.
Ivan Nikolaev, Network Service Anomaly Detection, Jun. 2014.
Martin Rataj, Simulation of Botnet C&C Channels, 2014.

(56) References Cited

OTHER PUBLICATIONS

Mustafa Toprak, Intrusion Detection System Alert Correlation with Operating System Level Logs, Dec. 11, 2009.
Nadler et al., Detection of Malicious and Low Throughput Data Exfiltration Over the DNS Protocol, Jun. 18, 2018.
Palo Alto Networks, We Know it Before You Do: Predicting Malicious Domains, retrieved on Jun. 22, 2015.
Pedro Marques da Luz, Thesis, Botnet Detection Using Passive DNS, 2013/2014.
Qi et al., A Bigram Based Real Time DNS Tunnel Detection Approach, Procedia Computer Science 17, 2013, pp. 852-860.
Schüppen et al., FANCI: Feature-based Automated NXDomain Classification and Intelligence, Proceedings of the 27th Usenix Security Symposium, Aug. 2018, pp. 1165-1181.
Sebastian Garcia, Identifying, Modeling and Detecting Botnet Behaviors in the Network, Nov. 2014.
Seung Won Shin, Protecting Networked Systems from Malware Threats, Aug. 2013.
Shehar Bano, A Study of Botnets: Systemization of Knowledge and Correlation-based Detection, Oct. 2012.
Vishnu Teja Kilari, Thesis, Detection of Advanced Bots in Smartphones Through User Profiling, Dec. 2013.
Xu et al., We Know it Before You Do: Predicting Malicious Domains, Virus Bulletin Conference Sep. 2014.
Xu et al., We Know it Before You Do: Predicting Malicious Domains, Sep. 2014.
Van Der Toorn et al., TXTing 101: Finding Security Issues in the Long Tail of DNS TXT Records, 2020 IEEE European Symposium on Security and Privacy Workshops, 2020, pp. 544-549.
Qi et al., BotCensor: Detecting DGA-Based Botnet Using Two-Stage Anomaly Detection, 2018 17th IEEE International Conference On Trust, Security And Privacy In Computing And Communications/12th IEEE International Conference On Big Data Science And Engineering, pp. 754-762.

* cited by examiner

| 402 | 404 |
| --- | --- |
| reddit.map.fastly.net | 1.0 |
| dualstack.f3.shared.global.fastly.net | 0.913 (f3 is not meaningful) |
| p23-buy.itunes-apple.com.akadns.net | 0.85 (p23 is not meaningful) |
| prod.nexusrules.live.com.akadns.net | 1.0 |

FIG. 4A

| 452 | 454 |
| --- | --- |
| 1861IDa23d57f90-0-2D-2D.prosalar.com | 0 |
| 9773IDa23d57f91-0-2D-2D.prosalar.com | 0 |
| 000000C299F0C7C3FCA287.proxycheker.pro | 0 |
| 000C0002909FC7C39A467.proxycheker.pro | 0 |

FIG. 4B

REAL-TIME DETECTION OF DNS TUNNELING TRAFFIC

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIGS. 4A and 4B respectively illustrate meaningful word ratios for, for example, legitimate and malicious domains.

DETAILED DESCRIPTION

Figure 1:
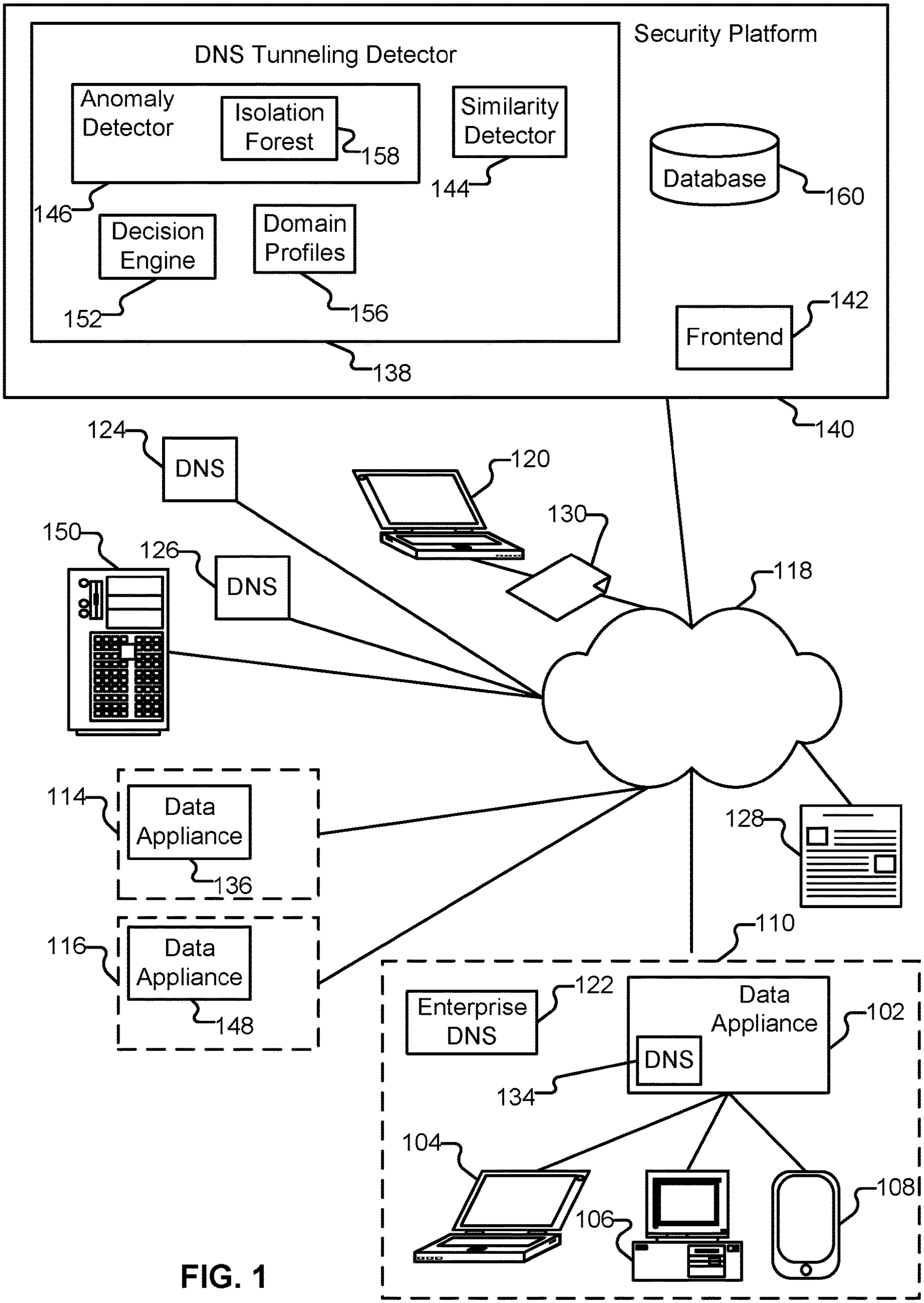
FIG. 1 illustrates an example of an environment in which malware is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API, allow enterprises to proactively monitor VM changes, dynamically feeding that context into security policies, thereby eliminating the policy lag that may occur when VMs change.

II. Example Environment

FIG. 1 illustrates an example of an environment in which malware is detected and its harm reduced. In the example shown, client devices 104-108 are a laptop computer, a desktop computer, and a tablet (respectively) present in an enterprise network 110 (belonging to the "Acme Company"). Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 110.

Data appliance 102 can be configured to work in cooperation with a remote security platform 140. Security platform 140 can provide a variety of services, including performing static and dynamic analysis on malware samples, and providing a list of signatures of known-malicious files to data appliances, such as data appliance 102 as part of a subscription. In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
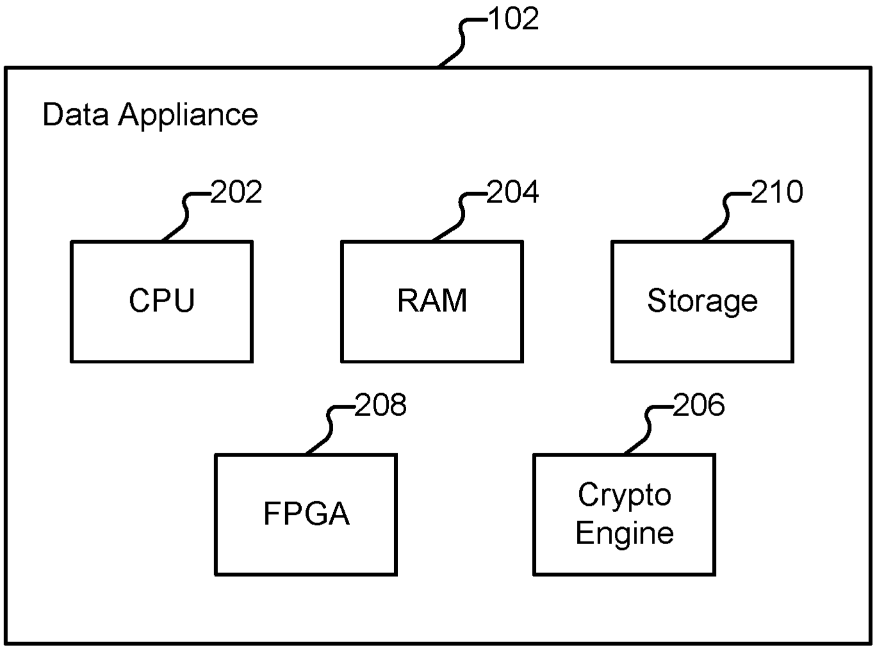
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
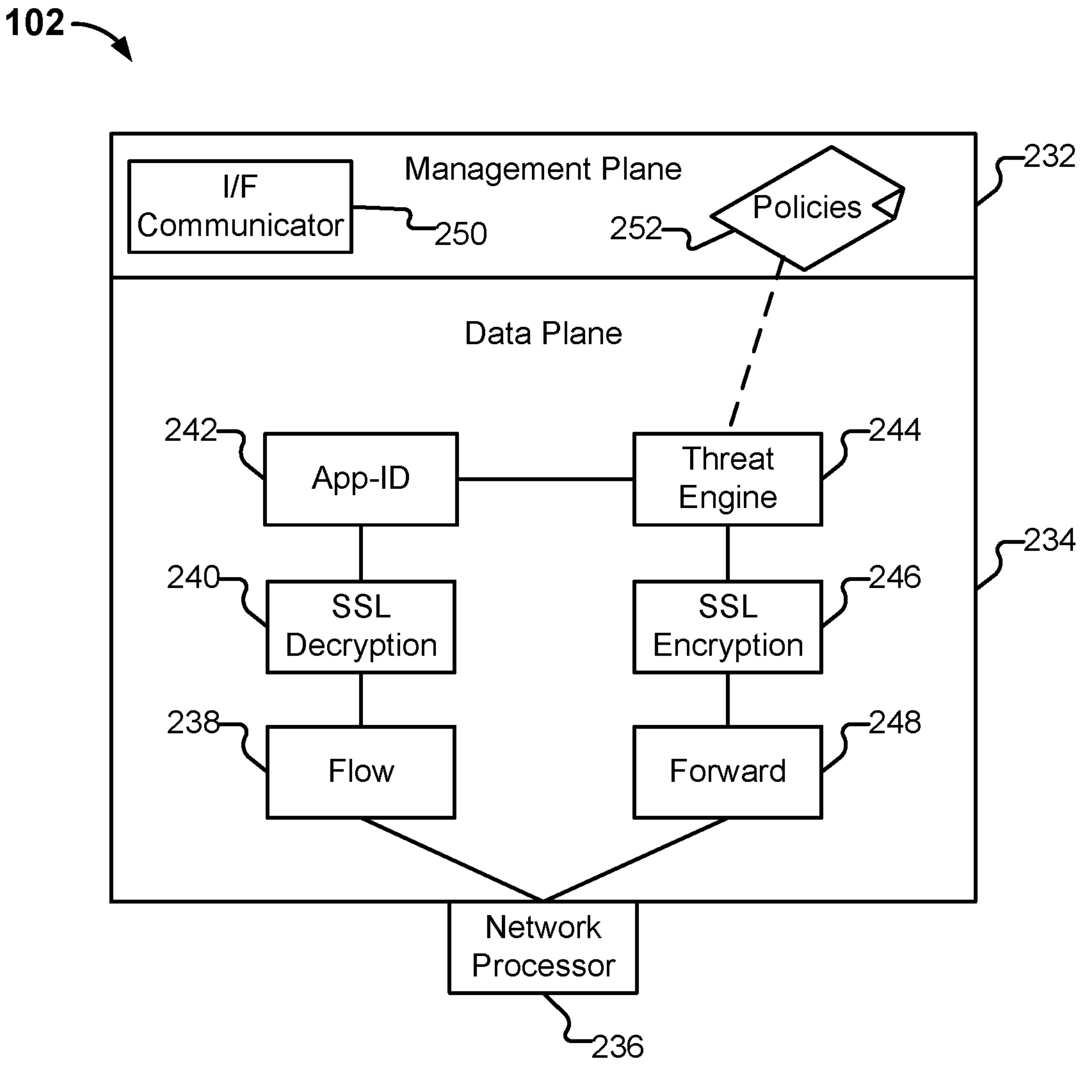
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. DNS Tunneling Traffic

A. Overview of DNS Tunneling

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjqfeuo32ylhkjshdflu23.badsite.com, where the subdomain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Figure 3:
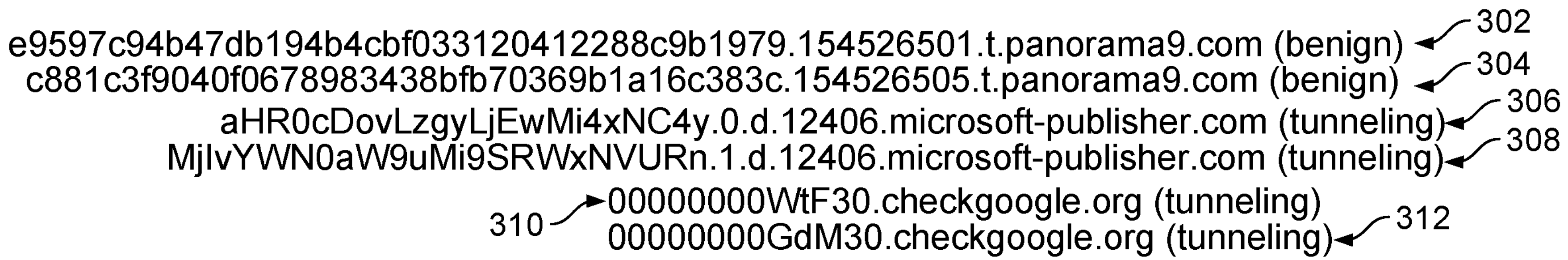
FIG. 3 illustrates benign DNS query information and malicious DNS query information.

Detecting and preventing DNS tunneling attacks is difficult for a variety of reasons. A first reason is illustrated in FIG. 3 which shows both benign DNS query information (302, 304) and malicious DNS query information (306-312). Many legitimate services (e.g., content delivery networks, web hosting companies, etc.) legitimately use the subdomain portion of a domain name to encode information to help support use of those legitimate services. The encoding patterns used by such legitimate services can vary widely among providers and (as illustrated in FIG. 3) benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious DNS tunneling can efficiently be detected, in real time, and stopped.

B. DNS Resolution

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116 having respective data appliances 136 and 148)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

C. DNS Tunneling Detection

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that are similar to the detected root domains.

As data appliance 102 receives DNS queries (e.g., from DNS module 134), it provides them to security platform 140 which performs both anomaly detection and similarity detection, respectively. In various embodiments, a domain (e.g., as provided in a query received by security platform 140) is classified as a malicious DNS tunneling root domain if either detector flags the domain.

1. Anomaly Detector

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]). Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), they are highly unlikely to be misclassified as malicious tunneling. The following are example characteristics that can be extracted as features (e.g., into a feature vector) for a given group of domains (i.e., sharing a root domain).

1. The number of distinct FQDNs in the group: Typically, legitimate domains will tend to have a small number of FQDNs (e.g., mail.example.com and ftp.example.com). In contrast, as malicious DNS tunneling encodes a message, significantly more FQDNs will be used. An example value for this feature for a benign domain is "5" and an example value for this feature for a malicious domain is "568."
2. The average DNS query count for each FQDN: Typically, legitimate domains will tend to have many queries (for a small number of FQDNs). In contrast, as malicious DNS tunneling encodes a message, each FQDN will typically have only one query count.
3. The Jeffrey distribution of DNS query counts for all FQDNs: Typically, legitimate domains will tend to have a nonzero number. In contrast, malicious DNS tunneling domains will tend to have a zero number.
4. The average length of FQDNs in the group: Typically, legitimate domains will tend to have shorter average domain name lengths than malicious DNS tunneling domains.
5. The ratio of queries for A/AAAA/CNAME/NS/MX records: Typically, the kinds of queries performed involving legitimate domains will involve A, MX, and CNAME records. The ratio of different kinds of queries can be used as a feature.
6. The ratio of meaningful words in all FQDN names in the group: Typically, legitimate domains (e.g., content delivery network domains) will include meaningful words in subdomain names (e.g., as determinable using a dictionary or other list of predetermined words). In contrast, as malicious DNS tunneling encodes a message, such subdomains generally comprise meaningless characters. FIGS. 4A and 4B respectively illustrate meaningful word ratios for, for example legitimate and malicious domains. In particular, region 402 lists a set of legitimate domains, region 452 lists a set of malicious domains, and their respective ratios are shown in regions 404 and 454. In the examples shown in FIGS. 4A and 4B, the ratio is computed as the number of characters comprising meaningful words out of all characters in the subdomain.
7. The n-gram frequency of all FQDN names in the group: The type of "n" gram used can be set variously in different embodiments. In an example embodiment, 4-grams are evaluated. Typically, legitimate domains will tend to have lower 4-gram frequency than malicious DNS tunneling domains.
8. The entropy of the FQDNs in the group: Typically, legitimate domains will tend to have less entropy in their FQDNs than malicious DNS tunneling domains.
9. Whether or not the domains use trusted authoritative DNS servers: Typically, legitimate domains will use well-established third party managed DNS servers. For example, 44 million root domains use domaincontrol.com (provided by GoDaddy). While a few legitimate root domains (e.g., google.com) manage their own DNS servers (e.g., ns.google.com), such DNS servers can also be considered as trusted. In contrast, in order for malicious DNS tunneling to work, the DNS server (e.g., proxychecker.pro, ziyouforever.com, 63z.de) needs to be controlled by the tunneling domain. For this feature, a root domain is assigned a value of "1" if it uses a trusted authoritative DNS server (e.g., as determined by comparing its DNS server(s) against a whitelist of known trusted DNS servers) and a "0" otherwise.
10. The compression rate of the FQDNs in the group: Typically, malicious DNS tunneling domain names contain compressed data. The compression rate of domain names can be used as a feature (e.g., as (length of GZIPed string/length of original string)).

In various embodiments, the feature vector associated with a given root domain (e.g., foo.com) is updated each time a DNS query associated with that root domain is received by security platform 140. Each time the feature vector for a root domain (e.g., foo.com) is updated, it is checked against a pre-built benign traffic model. The model can be built using any appropriate anomaly detection approach, and stays stable, even across different networks. One example of such an approach is an isolation forest approach (e.g., implemented using the scikit-learn python tool) where an ensemble of iTrees is built, with each iTree representing a domain profile of benign DNS queries. The isolation forest approach is fast, computation and memory efficient, scales to a very large dataset, and can be particularly useful where (e.g., with malicious DNS tunneling traffic) the training data set is heavily lopsided (i.e., with many more available benign examples than malicious ones). In various embodiments, isolation forest 158 is trained using benign traffic only (e.g., using feature vectors previously collected for benign DNS query information). Any anomalies detected by the model are anomalous to benign DNS traffic and thus can be classified as malicious DNS tunneling traffic. If the traffic is determined to be malicious DNS tunneling, a remedial action can be taken (e.g., with security platform 140 instructing data appliance 102 to block any traffic that includes the root domain (thus also blocking any subdomains))

2. Similarity Detector

While an attacker may use multiple different domains for DNS tunneling (e.g., xyz.baddomain.com and abc.terriblespamsite.io), those domains may share at least a portion of infrastructure. For example, both sites may make use of similar message encoding schemes for receiving DNS tunneled messages (e.g., 1861IDa23d57f90-0-2D-2D.baddomain.com and 9773IDa23d57f91-0-2D-2D.terriblespamsite.io, where "-0-2D-2D" is common to both). Such patterns can be extracted (e.g., using python) from known malicious DNS tunneling messages (e.g., by DNS tunneling detector 138) and stored as regular expressions for use by similarity detector 144. Similarly, both baddomain.com and terriblespamsite.io may make use of a DNS server having a single IP address (e.g., 123.45.67.89) to receive their respective DNS queries. IP addresses of known DNS tunneling servers can also be used by similarity detector 144.

In addition to providing DNS query information received from data appliance 102 to anomaly detector 146, in various embodiments, security platform 140 also provides the information to similarity detector 144. Similarity detector 144 is configured to use a set of previously determined regular expressions and previously determined IP addresses (corresponding to known malicious tunneling traffic/servers) to detect new malicious DNS tunneling servers.

D. Example Process

Figure 5:
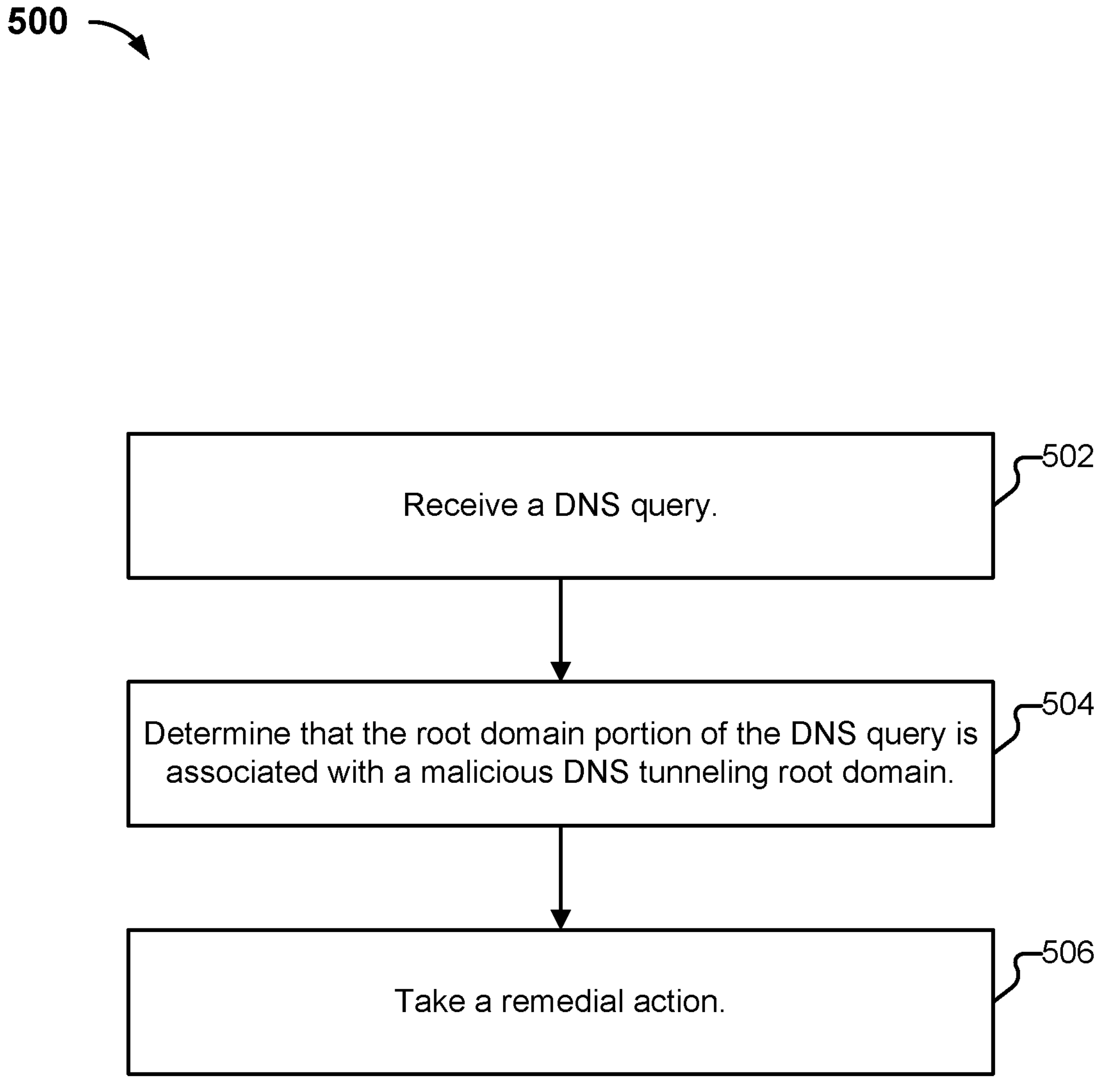
FIG. 5 illustrates an example of a process for detecting malicious DNS tunneling activity.

FIG. 5 illustrates an example of a process for detecting malicious DNS tunneling activity. In various embodiments, process 500 is performed by security platform 140. Process 500 can also be performed by other types of platforms/devices, as applicable, such as data appliance 102, client device 104, etc. Process 500 begins at 502 when a DNS query is received. As one example, a DNS query is received at 502 by frontend 142 when DNS module 134 receives (whether actively or passively) a DNS resolution request from client device 104. In some embodiments, DNS module 134 provides all DNS resolution requests as queries to platform 140 for analysis. DNS module 134 can also more selectively provide such requests to platform 140. One example reason DNS module 134 might not query platform 140 for a domain is where information associated with the domain is cached in data appliance 102 (e.g., because client device 106 previously requested resolution of the domain and process 500 was previously performed with respect to the domain). Another example reason is that the domain is on a whitelist/blacklist/etc., and so additional processing is not needed.

At 504, a determination is made that a root domain portion of the received DNS query is associated with a malicious DNS tunneling root domain. As described above, two example tools for making such a determination are anomaly detector 146 or similarity detector 144. If either (or both) such tool makes such a determination, decision engine 152 (or any other appropriate component, including anomaly detector 146 and similarity detector 144 themselves) can conclude that a remedial action should be taken in response. Finally, at 506, one or more appropriate remedial actions are taken. Examples of such actions include platform 140 instructing data appliance 102 to block further communication with the implicated root level domain, informing data appliance 102 that the domain is a malicious tunneling domain (but allowing data appliance 102 to make its own determination of what to do as a result, such as alerting an administrator that a given client has attempted to contact a malicious DNS tunneling server and quarantining the client device from other nodes on the network), extracting IP address and/or regular expression pattern information from the implicated DNS query, etc.

Figure 6:
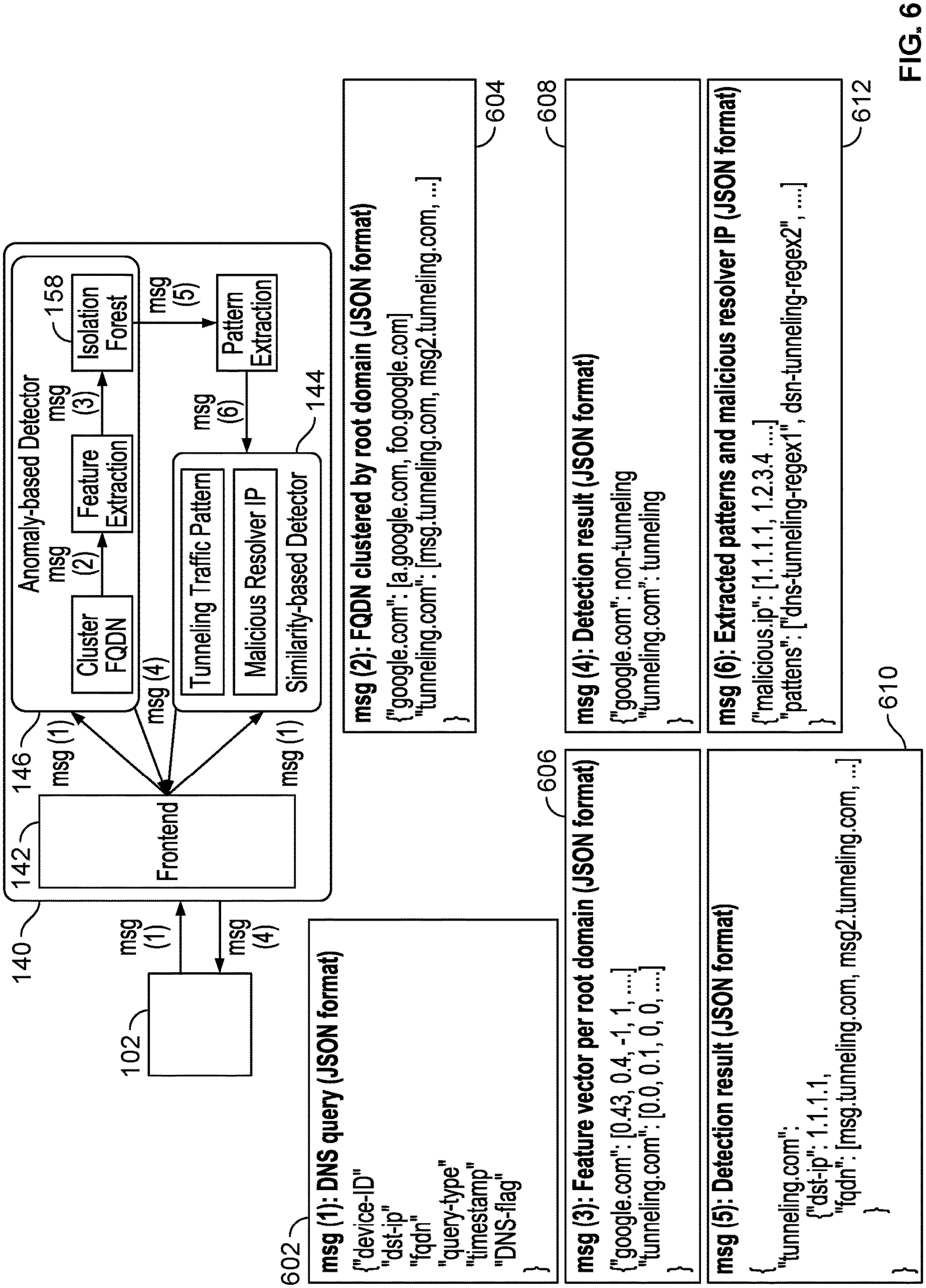
FIG. 6 illustrates example embodiments of messages that can be exchanged between various components of the environment shown in FIG. 1.

FIG. 6 illustrates example embodiments of messages that can be exchanged between various components of the environment shown in FIG. 1. The first message (602) is an example of DNS query information that can be sent by appliance 102 to platform 140. Message 602 is then provided to both the anomaly detector (146) and similarity detector (144). The second message (604) is an example of root domain profile information provided for feature extraction. The third message (606) is an example of feature vector information provided to isolation forest 158. The fourth message (608) is an example of detection results determined by anomaly detector 146. The fifth message (610) is an example of a positive malicious tunneling detection result that can be used for IP address and regular expression pattern extraction. The sixth message (612) is an example of IP address and regular expression patterns after extraction.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive, from a client device, a DNS query comprising: (1) a subdomain portion and (2) a root domain portion;

determine that the root domain portion received in the DNS query is associated with a malicious DNS tunneling root domain, wherein the determination is based at least in part on receiving information obtained from a similarity detector, wherein the similarity detector is configured to:

use a stored set of previously determined regular expressions previously extracted from a set of known malicious DNS tunneling messages associated with at least one previously identified malicious DNS tunneling root domain, wherein the set of previously determined regular expressions represent one or more patterns corresponding to at least one encoding scheme usable to encode and subsequently decode a DNS tunnelable message; and take a remedial action in response to the determining, including by preventing the client device from communicating with a node associated with the DNS query; and a memory coupled to the processor and configured to provide the processor with instructions.

2. The system of claim 1, wherein, in response to receiving the DNS query, a feature vector associated with the root domain portion is updated.

3. The system of claim 2, wherein the feature vector maintains information for a sliding time window of DNS query information.

4. The system of claim 2, wherein a feature included in the feature vector represents a number of distinct fully qualified domain names associated with the root domain portion.

5. The system of claim 2, wherein a feature included in the feature vector represents an average DNS query count for each fully qualified domain name associated with the root domain portion.

6. The system of claim 2, wherein a feature included in the feature vector represents a Jeffrey distribution of DNS query counts for all fully qualified domain names associated with the root domain portion.

7. The system of claim 2, wherein a feature included in the feature vector represents an average length of fully qualified domain names associated with the root domain portion.

8. The system of claim 2, wherein a feature included in the feature vector represents a ratio of record type queries.

9. The system of claim 2, wherein a feature included in the feature vector represents a ratio of meaningful words in fully qualified domain names associated with the root domain portion.

10. The system of claim 2, wherein a feature included in the feature vector represents an n-gram frequency of fully qualified domain names associated with the root domain portion.

11. The system of claim 2, wherein a feature included in the feature vector represents entropy of fully qualified domain names associated with the root domain portion.

12. The system of claim 2, wherein a feature included in the feature vector represents whether or not the root domain portion is associated with a trusted authoritative DNS server.

13. The system of claim 2, wherein the updated feature vector is compared against a previously built benign traffic model.

14. The system of claim 13, wherein the previously built benign traffic model comprises an isolation forest.

15. The system of claim 1, wherein determining that the root domain portion received in the DNS query is associated with the malicious DNS tunneling root domain includes determining that a server associated with the root domain portion and the malicious DNS tunneling root domain share a DNS server having a single IP address.

16. A method, comprising:

receiving, from a client device, a DNS query comprising: (1) a subdomain portion and (2) a root domain portion;

determining that the root domain portion received in the DNS query is associated with a malicious DNS tunneling root domain, wherein the determination is based at least in part on receiving information obtained from a similarity detector, wherein the similarity detector is configured to:

use a stored set of previously determined regular expressions previously extracted from a set of known malicious DNS tunneling messages associated with at least one previously identified malicious DNS tunneling root domain, wherein the set of previously determined regular expressions represent one or more patterns corresponding to at least one encoding scheme usable to encode and subsequently decode a DNS tunnelable message; and taking a remedial action in response to the determining, including by preventing the client device from communicating with a node associated with the DNS query.

17. A computer program product embodied in a non-transitory computer readable storage medium and comprising computer instructions for:

receiving, from a client device, a DNS query comprising: (1) a subdomain portion and (2) a root domain portion;

determining that the root domain portion received in the DNS query is associated with a malicious DNS tunneling root domain, wherein the determination is based at least in part on receiving information obtained from a similarity detector, wherein the similarity detector is configured to:

use a stored set of previously determined regular expressions previously extracted from a set of known malicious DNS tunneling messages associated with at least one previously identified malicious DNS tunneling root domain, wherein the set of previously determined regular expressions represent one or more patterns corresponding to at least one encoding scheme usable to encode and subsequently decode a DNS tunnelable message; and taking a remedial action in response to the determining, including by preventing the client device from communicating with a node associated with the DNS query.

18. The method of claim 16, wherein, in response to receiving the DNS query, a feature vector associated with the root domain portion is updated.

19. The method of claim 18, wherein the feature vector maintains information for a sliding time window of DNS query information.

20. The method of claim 18, wherein a feature included in the feature vector represents a number of distinct fully qualified domain names associated with the root domain portion.

21. The method of claim 18, wherein a feature included in the feature vector represents an average DNS query count for each fully qualified domain name associated with the root domain portion.

22. The method of claim 18, wherein a feature included in the feature vector represents a Jeffrey distribution of DNS query counts for all fully qualified domain names associated with the root domain portion.

23. The method of claim 18, wherein a feature included in the feature vector represents an average length of fully qualified domain names associated with the root domain portion.

24. The method of claim 18, wherein a feature included in the feature vector represents a ratio of record type queries.

25. The method of claim 18, wherein a feature included in the feature vector represents a ratio of meaningful words in fully qualified domain names associated with the root domain portion.

26. The method of claim 18, wherein a feature included in the feature vector represents an n-gram frequency of fully qualified domain names associated with the root domain portion.

27. The method of claim 18, wherein a feature included in the feature vector represents entropy of fully qualified domain names associated with the root domain portion.

28. The method of claim 18, wherein a feature included in the feature vector represents whether or not the root domain portion is associated with a trusted authoritative DNS server.

29. The method of claim 18, wherein the updated feature vector is compared against a previously built benign traffic model.

30. The method of claim 29, wherein the previously built benign traffic model comprises an isolation forest.

31. The method of claim 16, wherein determining that the root domain portion received in the DNS query is associated with the malicious DNS tunneling root domain includes determining that a server associated with the root domain portion and the malicious DNS tunneling root domain share a DNS server having a single IP address.

* * * * *